(12) United States Patent
Wnuk

(10) Patent No.: US 10,204,378 B1
(45) Date of Patent: Feb. 12, 2019

(54) FLEXIBLE PAYMENT SERVICES FOR TRAVEL AND CREDIT CARDS

(71) Applicant: John Matthew Wnuk, Mesa, AZ (US)

(72) Inventor: John Matthew Wnuk, Mesa, AZ (US)

( * ) Notice: Subject to any disclaimer, the term of this patent is extended or adjusted under 35 U.S.C. 154(b) by 0 days.

(21) Appl. No.: 15/812,886

(22) Filed: Nov. 14, 2017

(51) Int. Cl.
*G06Q 40/04* (2012.01)
*G06Q 20/38* (2012.01)
*G06Q 20/40* (2012.01)
*G06Q 20/36* (2012.01)
*G06Q 20/22* (2012.01)

(52) U.S. Cl.
CPC .......... *G06Q 40/04* (2013.01); *G06Q 20/223* (2013.01); *G06Q 20/363* (2013.01); *G06Q 20/3678* (2013.01); *G06Q 20/381* (2013.01); *G06Q 20/4014* (2013.01); *G06Q 20/4018* (2013.01)

(58) Field of Classification Search
CPC combination set(s) only.
See application file for complete search history.

(56) References Cited

U.S. PATENT DOCUMENTS

2013/0166455 A1* 6/2013 Feigelson ............. H04L 9/3234
  705/64
2015/0363770 A1* 12/2015 Ronca ................. G06Q 20/382
  705/66

* cited by examiner

*Primary Examiner* — Tsan-Yu J Huang

(57) ABSTRACT

Flexible fiat and cryptocurrency Payment Services (FfcPS) are disclosed for travel and credit cards. This invention applies to U.S. Dollar, European Euro and other fiat, and Bitcoin, Ethereum and other cryptocurrencies. Merchants that use this invention would add a new item to their (room) key cards and credit cards—a Merchant cryptocurrency wallet public address Quick Response (QR) Code (Merchant QR Code). The Merchant QR Code's associated cryptocurrency wallet public address is recorded on a blockchain public ledger whenever used for a cryptocurrency payment from a consumer. That cryptocurrency payment is then converted to a fiat payment that's added to a merchant account for the consumer by an online exchange. For smart consumers, this invention would allow use of fiat or cryptocurrency with the best value at time of payment for fiat charges to a room or credit card.

4 Claims, 4 Drawing Sheets

Back of Bank credit card

3

FIG. 1A. Front of Cruise Ship key card
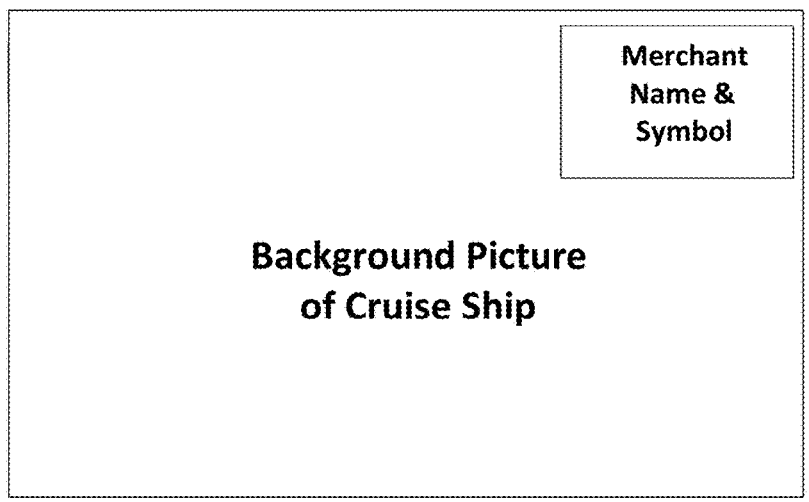
FIG. 1B. Back of Cruise Ship key card
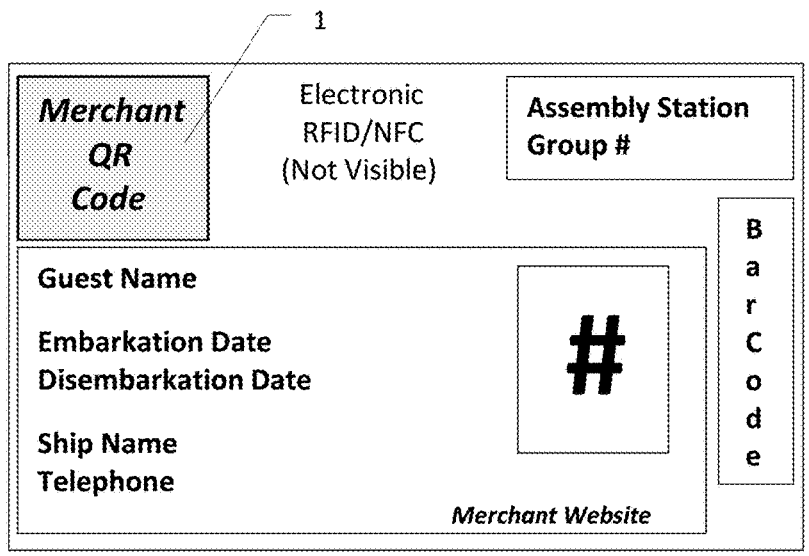

FIG. 2A. Front of Hotel key card
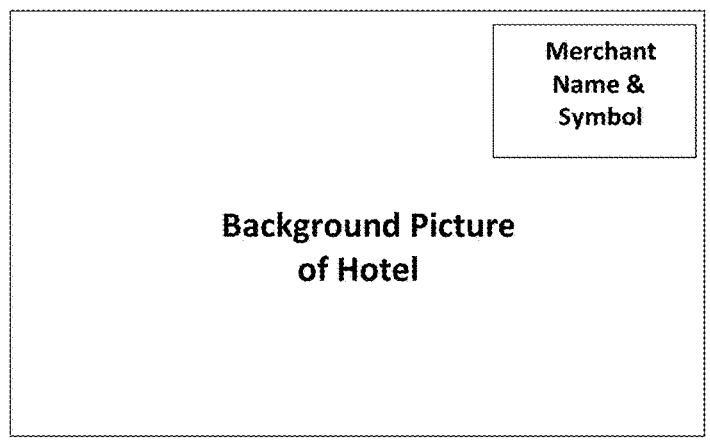
FIG. 2B. Back of Hotel key card
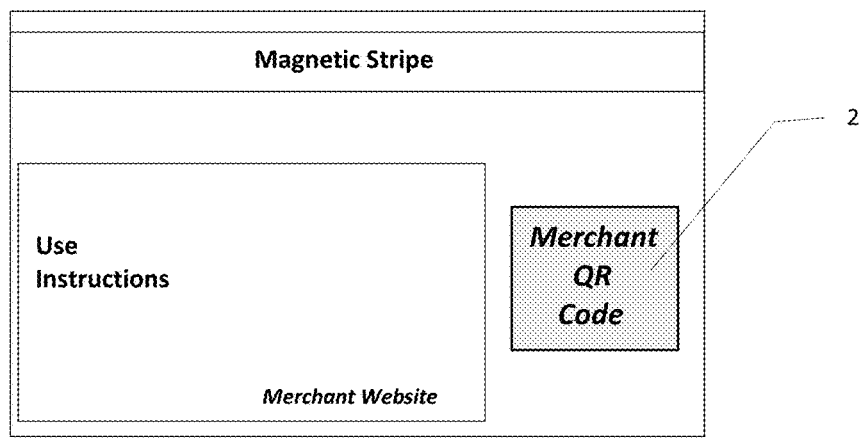

FIG. 3A. Front of Bank credit card
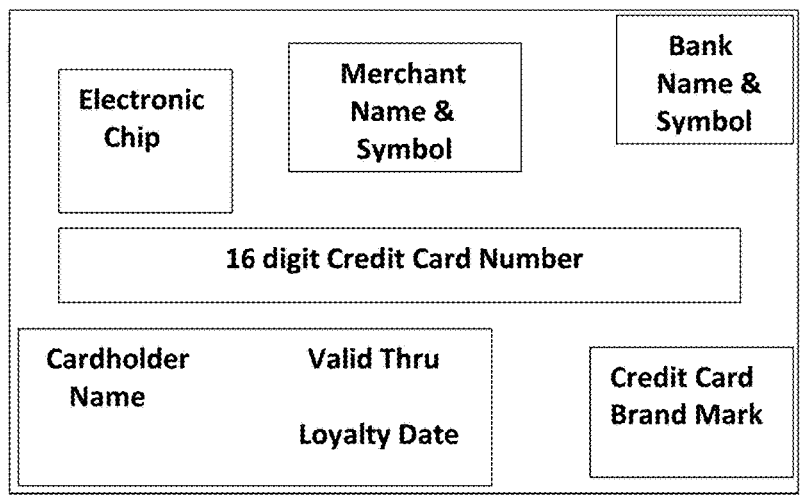
FIG. 3B. Back of Bank credit card
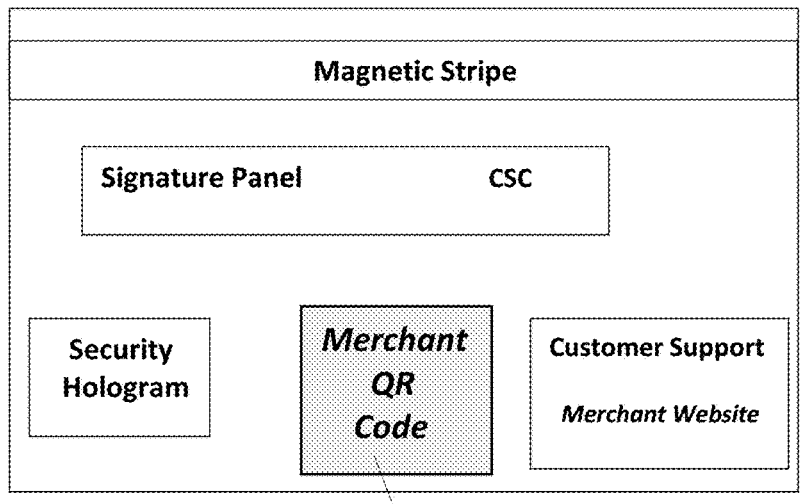

FIG. 4A. Front of Store credit card
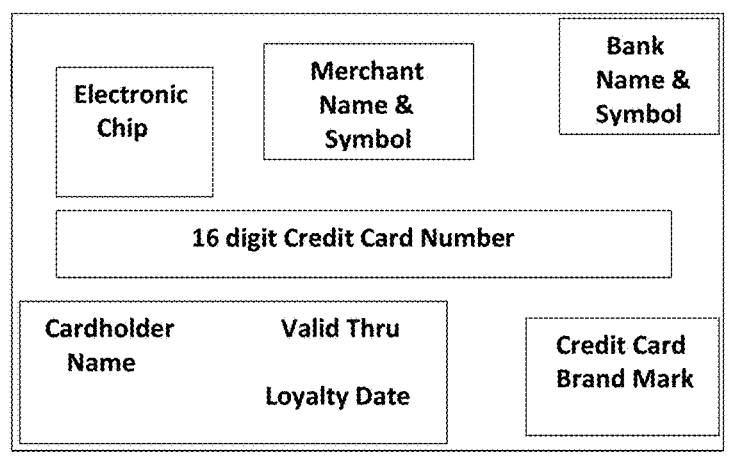
FIG. 4B. Back of Store credit card
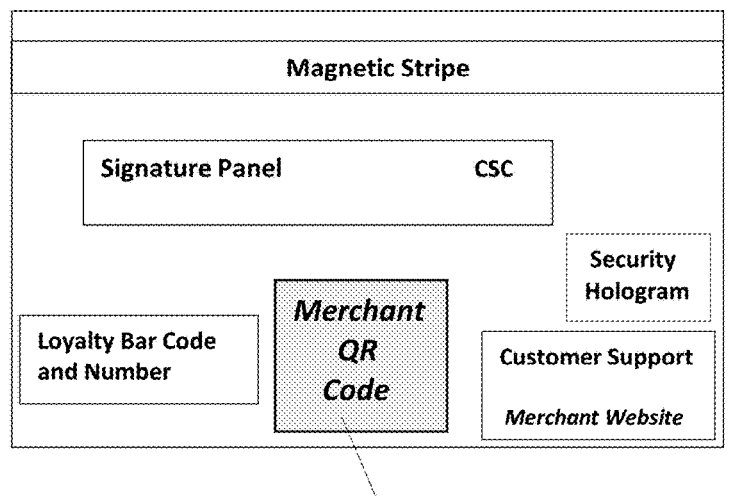

FLEXIBLE PAYMENT SERVICES FOR TRAVEL AND CREDIT CARDS

RELATED APPLICATION

This patent application claims the benefit of U.S. Provisional Patent Application 62/562,777, filed Sep. 25, 2017, which is hereby incorporated by reference.

BACKGROUND

Smart consumers look for products and services that offer the best value for their money. Merchants for these products and services have payment services that typically accepts only U.S. Dollar (USD), European Euro (EUR) or other fiat money. This invention modernizes merchant payment services so that consumers have the flexibility to pay for fiat charges with fiat or Bitcoin (BTC), Ethereum (ETH), or other cryptocurrencies. The term "cryptocurrency" in this invention is in common parlance with: "virtual currency," "digital money," "digital currency," "digital asset," "internet money," "electronic coin," "electronic cash," "peer-to-peer electronic cash," "unspent output," "unspent transaction output," and "UTXO." With this invention, consumers can use Flexible fiat and cryptocurrency Payment Services (FfcPS) to use money that has the best value at time of payment. For an example of money with best value, consider a consumer that purchased one BTC at $500 (500 USD) and wants to use that BTC when it's value is more than $500 at time of payment for a product or service, and would otherwise use USD.

BRIEF DESCRIPTION OF INVENTION

With this invention, travel and credit card merchants can modernize their traditional fiat-based payment services by adding cryptocurrency payment services. Examples of travel merchants that could use this invention include Viking® River and Ocean Cruises, Marriott Hotels and Resorts® and others that use (room) key cards for travel consumers. The term "key card" in this invention is in common parlance with: "proximity card," "prox card," "vicinity card," "contactless smartcard," or "magnetic stripe key card." Examples of credit card merchants that could use this invention include CapitalOne Bank®, Dillard's Retail Stores, Fry's Food Stores and other banks and stores with credit cards. With FfcPS, merchants could provide consumers with ability to use fiat or cryptocurrency with the best value at time of payment.

Fiat has exchange rates that can vary over time, and have associated credit cards and wallets. Fiat to fiat exchange rates for USD, EUR and other fiat are shown at Forex.com. Fiat-based credit cards have brand marks such as Visa®, Mastercard®, American Express® or other branded financial services companies. Fiat wallets hold cash, credit cards, identification such as a driver's license, or other physical material. Cryptocurrencies also have exchange rates that can vary over time and have associated cryptocurrency wallets. Fiat to cryptocurrency and cryptocurrency to cryptocurrency exchange rates for BTC, ETH and other cryptocurrencies are shown at CoinMarketCap.com. Cryptocurrency wallets are different from physical fiat wallets and have characteristics based on cryptography and mathematics.

A cryptocurrency wallet is an essential part of a cryptocurrency protocol. A cryptocurrency wallet includes one or more unique private key and public key pair, along with a (cryptographic) public hash and public address pair for each public key. The keys are based on Public Key Cryptography (PKC), Standards for Efficient Cryptography (SEC), and Elliptic Curve Digital Signature Algorithm (ECDSA) mathematics. Bitcoin, for example, uses PKC with Secp256k1 ECDSA that allows efficient computation from private key to public key, but the reverse from public key to private key is computationally infeasible. The public address, with associated Quick Response (QR) Code, is used to receive cryptocurrency in a cryptocurrency wallet and transactions are recorded in a permanent global blockchain public ledger. The (160 bit) public hash address is used for an efficient transaction message bit size and is also shown in a blockchain public ledger. The public key is used to validate digital signatures in electronic transactions. The private key, with associated QR Code, is used in a digital signature and to withdraw (or spend) from a cryptocurrency wallet. Cryptocurrency protocols are peer-to-peer, do not use 3rd party banks for transactions, and can be updated for improvements. Bitcoin, for example, has the Bitcoin Improvement Proposal (BIP), and other cryptocurrencies each have their own improvement process.

Cryptocurrency wallets are free and can be obtained as needed. Cryptocurrency wallets can be printed on paper, software applications on mobile devices or computers, or obtained from a fiat-cryptocurrency online exchange. Paper wallets can be printed using an internet website such as at Bitaddress.org. Bitcoin paper wallets are typically used for gifts, bonuses, trading, or long term storage in a secure vault, and can have improved security with BIP 0038 passphrase-protected private key. Software wallets include those from Electrum, Mycelium and other desktop wallets. Software wallets can be used on mobile devices or computers and can be a convenient way to send or receive cryptocurrency. Cryptocurrency wallets can also be obtained by registering for a merchant or consumer account with a fiat-cryptocurrency online exchange such as at Coinbase, Kraken or other exchange that operates as an asset broker between fiat and cryptocurrencies. Online exchanges follow Anti-Money Laundering/Know Your Customer (AML/KYC) regulations requiring due diligence in ascertaining and verifying information from clients before doing business with them. Contracts with a fiat-cryptocurrency online exchange would include details on: usable fiat and cryptocurrencies, financial limitations based on identity verification, fees and settlement delays in conversions between cryptocurrency and fiat, discounts, profit/loss data for tax reporting, and process improvement notifications. For taxes in the U.S., the Internal Revenue Service (IRS) guidance for cryptocurrency is to use tax principles that apply to "property."

The new idea in this invention is use of a Merchant cryptocurrency wallet public address QR Code (Merchant QR Code). Merchants would add a unique Merchant QR Code to each of their travel (room) key cards or credit cards. Consumers of travel and credit card services would have one or more unique (personal) cryptocurrency wallet(s) to receive, store or spend cryptocurrency. When a merchant billing statement is available and fiat payment is due, with FfcPS the consumer would have the flexibility to pay travel or credit card charges by using fiat or cryptocurrency with the best value at time of payment.

BRIEF DESCRIPTION OF DRAWINGS

The Drawings constitute a part of this specification, and explain the principles of the invention for use on key cards and credit cards.

FIG. 1A is an exemplary of the front of a Cruise Ship key card. Content can include: Merchant Name and/or Symbol such as a trademark or logo, and background picture representing the merchant's business. The key card can be used to unlock a room door, control electricity to a room, identify who got on or off a ship, and identify who's on board before leaving a port.

FIG. 1B is an exemplary of the back of a Cruise Ship key card. Content can include: text such as Guest Name, Embarkation and Disembarkation Dates, Ship Name and Telephone number, Merchant Website, Assembly Station and Group Number (#). The key card can also include: a Bar Code and electronic component such as Radio Frequency IDentification or Near Field Communications (RFID/NFC) (not visible). New with this invention is the addition of a Merchant QR Code 1.

FIG. 2A is an exemplary of the front of a Hotel key card. Content can include: a Merchant Name or Symbol such as a trademark or logo, and background picture representing the merchant's business. A key card for a hotel can be used to unlock a room door and control electricity to a room.

FIG. 2B is an exemplary of the back of a Hotel key card. Content can include: a Magnetic Stripe, and text such as Use Instructions and Merchant Website. New with this invention is the addition of a Merchant QR Code 2.

FIG. 3A is a exemplary of the front of a Bank credit card. Content can include: Credit Card Brand Mark, 16 digit Credit Card Number, Cardholder Name, Expiration Date, Loyalty Date, Electronic Chip, Merchant Name and Symbol, and associated Bank Name and Symbol if appropriate.

FIG. 3B is an exemplary of the back of a Bank credit card. Content can include: Magnetic Stripe, Signature Panel, three or four digit Card Security Code (CSC), Security Hologram (bird, world or other object), Merchant Website and Customer Support phone number. New with this invention is the addition of a Merchant QR Code 3.

FIG. 4A is an exemplary of the front of a Store credit card. Content can include: Credit Card Brand Mark, 16 digit Credit Card Number, Cardholder Name, Expiration Date, Loyalty Date, Electronic Chip, Merchant Name and Symbol, and associated Bank Name and Symbol if appropriate.

FIG. 4B is an exemplary of the back of a Store credit card. Content can include: Magnetic Stripe, Signature Panel, three or four digit CSC, Security Hologram, Loyalty Bar Code and Number (such as on a Fry's Food Stores credit card), Merchant Website and Customer Support phone number. New with this invention is the addition of the Merchant QR Code 4.

DETAILED DESCRIPTION OF INVENTION

How to Make the Invention:

For key cards, the Merchant QR Code 1, 2 does not have any interaction with text, Bar Code, electronic RFID/NFC or Magnetic Stripe, other than using space on a key card. For credit cards, the Merchant QR Code 3, 4 does not have any interaction with text, Bar Code, or electronics such as the Computer Chip, RFID/NFC or Magnetic Stripe, other than using space on a credit card. Merchants would control how the Merchant QR Code 1, 2, 3, 4 and related consumer charge and payment data are processed on their computer systems, and how provided to consumers using key cards or credit cards, or other consumer media such as TV screens, mobile devices, computers, mail, email, or online accounts.

While FIG's show the Merchant QR Code on the back of key cards and credit cards, the position on back or front would be a merchant's preference, subject to standards compliance. To facilitate making this invention, merchants would work with appropriate standards organizations including International Standards Organization (ISO) and International Electrotechnical Commission (IEC) and ISO/IEC: 6523, 7810, 7812, 14333, 15457, 15459, JTC1/SC17/WG1; and with Payment Card Industry Security Standards Council (PCI SSC) and their Data Security Standard (DSS). Merchants would also work with manufacturing organizations to include the Merchant QR Code 1, 2, 3, 4, in the production of key cards and credit cards.

Best practice for one-time or reuse of cryptocurrency wallet public addresses, depends on whether the address is in a sending cryptocurrency wallet or receiving cryptocurrency wallet. A "receiving" public address can be safely reused multiple times. By design in cryptocurrency protocols, a receive public address is intended to be publicly displayed anywhere, for anyone to send cryptocurrency to that public address. It's like a public mailing address where anyone, anywhere can send physical mail to that address. There is different intent for the "sending" public address. By design, cryptocurrency transactions are viewable in a blockchain public ledger, and privacy depends on pseudonymity or strict separation between public addresses and personal identities. An observer, or potential hacker, capable of linking cryptocurrency public addresses to personal identities can draw conclusions about cryptocurrency transfers between people, since a transaction also includes the public key of the sending cryptocurrency wallet. Merchants and consumers can make observations more difficult, and not worth the computational cost of trying to link public addresses with persons, by using a sending public address, and associated public key, only one-time. Therefore, one-time use of a sending public address would be a characteristic of a mobile device, computer, or fiat-cryptocurrency online exchange used in this invention.

Best practice for cryptocurrency "change" also applies to this invention. An important part of a cryptocurrency protocol is the "transaction" process between cryptocurrency wallets. A transaction can combine or split cryptocurrency, similar to what can be done with fiat at a bank. A bank teller can combine cash by taking five $10's and returning one $50 to a consumer, or split cash by taking one $20 and returning two $10's. While a bank teller can combine and split USD to granularity of a one-cent coin or penny ($1=100 pennies), a cryptocurrency transaction process, such as in Bitcoin, can combine and split BTC to granularity of one Satoshi (Sat), with one BTC=100,000,000 Sat. A Bitcoin transaction message operates with numbers of Sat, but Bitcoin Blockchain displays are selectable to BTC, MILLIBIT (=100,000 Sat or 0.001 BTC) or BITS (=1,000 Sat or 0.000001 BTC). For an example of a cryptocurrency transaction with "change" and selected Blockchain display at BTC, consider Jane who has a Bitcoin wallet and has accumulated BTC after receiving two transactions of 3.552 BTC and 2.1314 BTC, resulting in two "unspent" outputs. Jane then sends 4.011 BTC to Bob's Bitcoin wallet. The transaction process between Jane and Bob first combines the two unspent outputs in Jane's wallet to total 5.6834 BTC, and then splits that into 4.011 BTC that's sent to Bob's wallet and returns 1.6724 BTC (less fees) in "change" to Jane's wallet. For this transaction, the original 3.552 BTC and 2.1314 BTC are now recorded on the Blockchain public ledger as "spent" and cannot be spent again, and the 4.011 BTC owned by Bob and 1.6724 BTC (less fees) owned by Jane are recorded as "unspent" on the Blockchain public ledger. Considering privacy and pseudonymity, if the Bitcoin change is returned to Jane's original "sending" public address, that could reduce the privacy associated with one-time use of sending public addresses. Therefore, for this invention change is returned (sent) to a newly created public address associated with the Jane's sending Bitcoin wallet.

The number of cryptocurrency wallets, with unique and different addresses and keys, needed by merchants and consumers for this invention could be in the billions (roughly $2^{\wedge}30$). Will the supply of cryptocurrency wallets be enough to serve demand? The answer compares potential demand with potential supply of cryptocurrency wallets. An estimate of population on earth is approaching 8 billion (roughly $2^{\wedge}33$) people. For cryptocurrency wallets, estimate for number of unique Bitcoin wallets (with a 160 bit public cryptographic hash address for each public key) is $2^{\wedge}160$. Comparing demand with supply, the billions of people on earth could each have a thousand unique cryptocurrency wallets (roughly $2^{\wedge}43$ total), with enough supply (more than $2^{\wedge}159$) remaining for growth over many years or decades. Considering Ethereum and other types of cryptocurrency, the available supply of cryptocurrency wallets further increases. If demand also increases, there can be an improvement to increase the size of a public hash address to 256 bits with a supply of unique cryptocurrency wallets approaching $2^{\wedge}256$ for each type of cryptocurrency.

Cryptocurrency transactions between peer wallets are one-way and irreversible, with confirmation of cryptocurrency transactions recorded on a blockchain public ledger—that's part of a cryptocurrency infrastructure. The cryptocurrency transaction confirmation process is similar to a fiat Real Time Gross Settlement (RTGS) process used in over 50 countries. With RTGS, fiat transactions between banks A and B are one-way and irreversible, and do not require physical transfer of money. National central banks operate RTGS and make adjustments in bank electronic accounts, such that what's deducted from Bank A electronic account is added to Bank B electronic account. RTGS is part of a nation's financial infrastructure and contributes to confidence in use of fiat systems, and similarly, a blockchain infrastructure contributes to confidence in use of cryptocurrency systems. How to Use the Invention:

Considering ongoing need for improvements in cryptocurrency protocols, providing data for tax reporting, and following best practice for use of public addresses, cryptocurrency wallets from qualified fiat-cryptocurrency online exchanges may be the preferred choice of merchants and consumers. A merchant account at an online exchange would have an associated website, User ID, Password, and optional 2 Factor Authentication (2FA). The online merchant account would include a unique cryptocurrency wallet for each consumer and that wallet can have several unique public addresses, each with a Merchant QR Code 1, 2, 3, 4. A unique Merchant QR Code 1, 2, 3, 4, would be added to a key card or credit card for each consumer. Should a consumer key card or credit card be lost, stolen or expire, the merchant would have several replacement public addresses, each with an associated Merchant QR Code 1, 2, 3, 4.

With use of an online exchange, the private key that's used to sign transactions and spend money cryptocurrency, is owned by the online exchange and is not visible or usable by a merchant or consumer. The online exchange owning the private key (and owning the associated cryptocurrency) is like a bank owning deposited fiat with a "promise to pay" should the depositer request to withdraw that fiat. An online exchange can also provide more security with cryptocurrency storage labeled as a "vault." The vault can receive funds like other cryptocurrency wallets, but a withdrawal from a vault can take an extended period of time and require authorization from more than one owner.

A consumer's cryptocurrency wallet would have a Consumer cryptocurrency wallet public address QR Code (Consumer QR Code) that is not for use on merchant's key cards or credit cards.

To pay a merchant for a fiat charge using FfcPS, the consumer would have a choice of using fiat or cryptocurrency or both. Consider a travel example where charges are USD fiat and payments can be USD or BTC cryptocurrency or both. If BTC value is greater (after fees, discounts, taxes) relative to original USD to purchase BTC, the consumer can decide how much of available BTC to use for the payment. The consumer sends that BTC from a personal cryptocurrency wallet to a travel merchant cryptocurrency wallet public address with unique Merchant QR Code 1, 2, 3, 4 associated with the consumer's account. If BTC value is lower (after fees, discounts, taxes) relative to original USD to purchase BTC, the consumer can decide to pay using only USD. BTC and USD payment records would be on the merchant's computer system and billing statements. For BTC, a payment transaction confirmation record would also be on the Blockchain public ledger, and on the associated fiat-cryptocurrency online exchange. To settle a USD charge, the travel merchant computes the balance of USD to be charged to a consumer credit card that's on file with the merchant, by subtracting what was paid with BTC (converted to USD after fees and discounts by the online exchange) from the total USD travel charge.

Next, consider a credit card example where the USD charge was from travel, or for items purchased in a store, or both travel and store USD charges are in the same billing statement. With FfcPS, the credit card payment(s) can be in BTC or USD or both. If BTC value is higher (after fees, discounts, taxes) relative to original USD purchase price for BTC, the credit card consumer can decide how much of available BTC to use for the credit card payment. The consumer sends that BTC from a personal cryptocurrency wallet to a credit card merchant cryptocurrency wallet public address with unique Merchant QR Code 1, 2, 3, 4 associated with the consumer's account. If BTC value is lower (after fees, discounts, taxes) relative to USD purchase price of BTC, the consumer can decide to pay using only USD. BTC and USD payment records would be on the credit card merchant's computer system and billing statements. For BTC, a payment transaction confirmation record would also be on the Blockchain public ledger and on the associated fiat-cryptocurrency online exchange. To settle a credit card USD charge, the consumer determines the USD balance by subtracting what was paid with BTC (converted to USD after fees and discounts by the online exchange) from the total USD charge. The USD credit card balance is then paid from the consumer's USD bank account or other USD financial resource.

For merchants and consumers that prefer to use only fiat, there would be no impact. Their behaviors for selling and buying products and services with fiat can continue as is. Merchants can modernize with this invention when there are cost benefits or consumer demand. When a merchant offers FfcPS, their "terms of service" would include how fiat and cryptocurrency are processed for payments and returns from consumers, and how credits are applied to consumer accounts. Overstock™, an American internet retailer, can serve as an example of a merchant with methods for payments, returns, and credits using USD fiat and BTC cryptocurrency. Consumers can modernize with this invention when they see a benefit in using fiat or cryptocurrency with the best value at time of payment.

This specification supports amendments to the specification, abstract and claims.

The invention claimed is:
1. A method comprising:
setting up an account at a fiat-cryptocurrency online exchange (the exchange) by a travel merchant for a travel consumer, for cryptocurrency payments related to fiat charges to a room; and
getting a cryptocurrency wallet with unique public address and associated Merchant Quick Response (QR) Code, by the travel merchant from the exchange for the travel consumer; and
having a (room) key card made by the travel merchant, wherein the key card includes the Merchant QR Code with associated cryptocurrency wallet public address; and
receiving the key card that includes the Merchant QR Code by the travel consumer from the travel merchant; and
receiving a cryptocurrency to fiat conversion rate by the travel consumer from the exchange, to determine if the travel consumer's cryptocurrency or the travel consumer's fiat has the greatest current value before the travel consumer makes a payment for fiat charges to a room, considering fiat cost to purchase the cryptocurrency, cryptocurrency to fiat conversion fee, discount for use of cryptocurrency, and tax on profit in using cryptocurrency; and
using the consumer's cryptocurrency to pay charges to a room when cryptocurrency has greater value than fiat and the travel consumer sends cryptocurrency from a personal cryptocurrency wallet to the travel merchant's cryptocurrency wallet public address with associated Merchant QR Code on the travel consumer's key card, and that cryptocurrency transaction is viewable in a blockchain public ledger; and
receiving a cryptocurrency payment by the exchange from the travel consumer, with the exchange converting the cryptocurrency to fiat, and that fiat less conversion fee plus discount value is added to the exchange's travel merchant fiat account associated with the travel consumer; and
subtracting the fiat received from the exchange by the travel merchant from the fiat due from the travel consumer; and
charging the remainder fiat balance at end of travel to the fiat-based credit card on file with the travel merchant for the travel consumer; and
subtracting the fiat that was charged to the credit card by the travel merchant from the fiat balance due from the travel consumer.

2. A method comprising:
setting up an account at the exchange by a credit card merchant for a credit consumer, for payments related to charges to the credit consumer's fiat-based credit card; and
getting a cryptocurrency wallet with unique public address and associated Merchant QR Code, by the credit card merchant from the exchange for the credit consumer; and
having a credit card made by the credit card merchant, wherein the credit card includes the Merchant QR Code with associated cryptocurrency wallet public address; and receiving the credit card that includes the Merchant QR Code, by the credit consumer from the credit card merchant; and
receiving a cryptocurrency to fiat conversion rate by the credit consumer from the exchange, to determine if the credit consumer's cryptocurrency or the credit consumer's fiat has the greatest value, before the credit consumer makes a payment for fiat credit card charges, considering fiat cost to purchase the cryptocurrency, cryptocurrency to fiat conversion fee, discount for use of cryptocurrency, and tax on profit in using cryptocurrency; and
using the credit consumer's cryptocurrency to pay for credit card charges when cryptocurrency has greater value than fiat and the consumer sends cryptocurrency from the consumer's personal cryptocurrency wallet to the credit card merchant's cryptocurrency wallet public address with associated Merchant QR Code on the consumer's credit card, and that cryptocurrency transaction is viewable in a blockchain public ledger; and
receiving a cryptocurrency payment by the exchange from the credit consumer, with the exchange converting the cryptocurrency to fiat, and that fiat less conversion fee plus discount value is added to the exchange's credit card merchant fiat account associated with the credit consumer; and
subtracting the fiat received from the exchange by the credit card merchant from the fiat credit card balance due from the credit consumer; and
paying the remainder fiat credit card balance to the credit card merchant by the credit consumer using a bank account or other fiat-based financial asset of the credit consumer, when a payment for credit card charges is due.

3. A system comprising:
a processor; and
a memory storing computer executable instructions that when executed by the processor causes the processor to perform the steps of:
setting up an account at a fiat-cryptocurrency online exchange (the exchange) by a travel merchant for a travel consumer, for cryptocurrency payments related to fiat charges to a room; and
getting a cryptocurrency wallet with unique public address and associated Merchant Quick Response (QR) Code, by the travel merchant from the exchange for the travel consumer; and
setting up a travel merchant account associated with a travel consumer that includes a Merchant QR Code and associated travel merchant cryptocurrency wallet public address; and
having a (room) key card made by the travel merchant, wherein the key card includes the Merchant QR Code with associated cryptocurrency wallet public address; and
receiving the key card that includes the Merchant QR Code by the travel consumer from the travel merchant; and
receiving a cryptocurrency to fiat conversion rate by the travel consumer from the exchange, to determine if the travel consumer's cryptocurrency or the travel consumer's fiat has the greatest current value before the travel consumer makes a payment for fiat charges to a room, considering fiat cost to purchase the cryptocurrency, cryptocurrency to fiat conversion fee, discount for use of cryptocurrency, and tax on profit in using cryptocurrency; and using the consumer's cryptocurrency to pay charges to a room when cryptocurrency has greater value than fiat and the travel consumer sends cryptocurrency from a personal cryptocurrency wallet to the travel merchant's cryptocurrency wallet public address with associated Merchant QR Code on the travel consumer's key card, and that cryptocurrency transaction is viewable in a blockchain public ledger; and showing on the blockchain public ledger are cryptocurrency sent, sending travel consumer's personal cryptocurrency wallet public address, and receiving travel merchant's cryptocurrency wallet public address; and receiving a cryptocurrency payment by the exchange from the travel consumer, with the exchange converting the cryptocurrency to fiat, and that fiat less conversion fee plus discount value is added to the exchange's travel merchant fiat account associated with the travel consumer; and subtracting the fiat received from the exchange by the travel merchant from the fiat due from the travel consumer; and charging the remainder fiat balance at end of travel to the fiat-based credit card on file with the travel merchant for the travel consumer; and subtracting the fiat that was charged to the credit card by the travel merchant from the fiat balance due from the travel consumer.

4. A system comprising:

a processor; and a memory storing computer executable instructions that when executed by the processor causes the processor to perform the steps of:

setting up an account at the exchange by a credit card merchant for a credit consumer, for payments related to charges to the credit consumer's fiat-based credit card; and getting a cryptocurrency wallet with unique public address and associated Merchant QR Code, by the credit card merchant from the exchange for the credit consumer; and setting up a credit card merchant account associated with a credit consumer that includes a Merchant QR Code and associated credit card merchant cryptocurrency wallet public address; and having a credit card made by the credit card merchant, wherein the credit card includes the Merchant QR Code with associated cryptocurrency wallet public address; and receiving the credit card that includes the Merchant QR Code, by the credit consumer from the credit card merchant; and receiving a cryptocurrency to fiat conversion rate by the credit consumer from the exchange, to determine if the credit consumer's cryptocurrency or the credit consumer's fiat has the greatest value, before the credit consumer makes a payment for fiat credit card charges, considering fiat cost to purchase the cryptocurrency, cryptocurrency to fiat conversion fee, discount for use of cryptocurrency, and tax on profit in using cryptocurrency; and using the credit consumer's cryptocurrency to pay for credit card charges when cryptocurrency has greater value than fiat and the consumer sends cryptocurrency from the consumer's personal cryptocurrency wallet to the credit card merchant's cryptocurrency wallet public address with associated Merchant QR Code on the consumer's credit card, and that cryptocurrency transaction is viewable in a blockchain public ledger; and showing on the blockchain public ledger are cryptocurrency sent, sending credit consumer's personal cryptocurrency wallet public address, and receiving credit card merchant's cryptocurrency wallet public address; and receiving a cryptocurrency payment by the exchange from the credit consumer, with the exchange converting the cryptocurrency to fiat, and that fiat less conversion fee plus discount value is added to the exchange's credit card merchant fiat account associated with the credit consumer; and subtracting the fiat received from the exchange by the credit card merchant from the fiat credit card balance due from the credit consumer; and paying the remainder fiat credit card balance to the credit card merchant by the credit consumer using a bank account or other fiat-based financial asset of the credit consumer, when a payment for credit card charges is due.

* * * * *